United States Patent [19]

Sels et al.

[11] 4,216,108

[45] Aug. 5, 1980

[54] HARDENING SOLUTION FOR PROTEINACEOUS MATERIALS

[75] Inventors: Francis J. Sels, Kontich; Hendrik E. Kokelenberg, Merksem; George F. van Veelen, Mortsel, all of Belgium

[73] Assignee: AGFA-GEVAERT N.V., Mortsel, Belgium

[21] Appl. No.: 24,397

[22] Filed: Mar. 27, 1979

Related U.S. Application Data

[62] Division of Ser. No. 904,277, May 9, 1978.

[30] Foreign Application Priority Data

May 10, 1977 [GB] United Kingdom .............. 19576/77

[51] Int. Cl.[2] .............................................. C08K 1/82

[52] U.S. Cl. .................................... 252/182; 430/626; 430/451; 260/112 R; 260/117

[58] Field of Search ................ 252/182, 187 H, 188.3; 96/111, 50 PT; 260/112 R, 117; 106/125

[56] References Cited

U.S. PATENT DOCUMENTS

| | | | |
|---|---|---|---|
| 3,325,287 | 6/1967 | Yamamoto et al. | 96/111 |
| 3,701,664 | 10/1972 | Piller et al. | 96/111 |
| 3,826,788 | 7/1974 | Froehlich et al. | 96/111 |
| 4,017,413 | 4/1977 | Bittner et al. | 252/182 |
| 4,116,700 | 9/1978 | Himmelmann | 96/111 |

*Primary Examiner*—Won H. Louie, Jr.
*Attorney, Agent, or Firm*—William J. Daniel

[57] ABSTRACT

A proteinaceous material such as gelatin is hardened by treatment with an aqueous solution of a partial hydrolysis product of cyanuric chloride that has been buffered with a water-soluble borate, e.g. sodium metaborate, potassium metaborate or ammonium metaborate.

The proteinaceous material can be a proteinaceous coating such as a photographic silver halide emulsion layer, a backing layer, a protective layer, a filter layer or any other photographic auxiliary layer.

5 Claims, No Drawings

HARDENING SOLUTION FOR PROTEINACEOUS MATERIALS

This is a division of Ser. No. 904,277, filed May 9, 1978.

This invention relates to the hardening of proteinaceous materials, in particular gelatin, which is used as binder in photographic layers and to hardening solutions used therefor.

Various agents have been employed for hardening gelatin or other proteinaceous materials that are used as binder in photographic layers, e.g. in silver halide emulsion layers, protective coatings, subbing layers, antihalation layers, backing layers and so on. There can be mentioned: formaldehyde, chromium salts, dialdehydes, hydroxyaldehydes, chlorides of dibasic organic acids and dianhydrides of tetracarboxylic acids. Most of these compounds exhibit disadvantages such as being photographically active, or often causing fogging of the emulsions on prolonged storage. Others are responsible for a decrease of the sensitivity of the photographic emulsion. Anhydrides and acid chlorides lower the pH value of the emulsion layer, thus requiring a readjustment with alkali. Furthermore, in many cases the viscosity of the coating composition is raised to an alarming degree. Other hardening agents have the disadvantage of becoming operative only after a prolonged storage time, while others such as formaldehyde are volatile so that an exact dosage of the quantities to be added is practically impossible.

Cyanuric chloride has been proposed as hardening agent for gelatin. However, because of the large reactivity of this compound there is an immediate and undesired viscosity increase in the aqueous gelatin solution as well as an irreversible coagulation. In U.S. Pat. No. 3,325,287 water-soluble salts of 2,4-dichloro-6-hydroxy-s-triazine have been proposed for use as gelatin hardeners having no detrimental photographic effects, being not affected by other additives like colour couplers, showing no after-hardening effects and imparting to gelatin high resistance to water and alkali even at elevated temperature, a feature which is especially useful for materials to be processed at elevated temperature. The water-soluble compounds are obtained by partial hydrolysis under carefully controlled conditions of cyanuric chloride in aqueous alkaline solution e.g. aqueous sodium or potassium hydrogen carbonate. A solid salt need not be separated and the partial-hydrolysis-aqueous liquid can be added as such to the gelatin coating composition or applied to the gelatin coating.

Although the partial hydrolysis product of cyanuric chloride with sodium or potassium hydrogen carbonate is an advantageous hardener for photographic gelatin compositions, it has one serious drawback, namely the continued evolution of carbon dioxide gas bubbles during storage of the solution and during use, with the result that:

during storage of the hardener solution under normal conditions further evolution of carbon dioxide takes place by a continued slow hydrolysis, so that an overpressure may be built up in a closed vessel, which might give rise to an explosion, and during the hardening reaction with gelatin the carbon dioxide gas formation may entail the formation of bubbles in the hardened layer.

According to the present invention a hardening process for proteinaceous compositions; in particular gelatin compositions for photographic silver halide elements, is provided which exhibits no detrimental photographic effects, produces layers which become insoluble in aqueous solutions of varying pH or temperature, and impart to these layers a greatly increased abrasion resistance.

According to the invention a process is provided for hardening proteinaceous materials, by treatment with an aqueous solution of a partial hydrolysis product of cyanuric chloride wherein the said aqueous solution is buffered by means of a water-soluble borate, in particular an alkali metal, e.g. sodium or potassium, or an ammonium metaborate or higher homologue thereof e.g. tetraborate.

The partial hydrolysis product of cyanuric chloride is formed in aqueous alkaline medium. It can be formed as described in U.S. Pat. No. 3,325,287, e.g. by dissolving cyanuric chloride in an aqueous hydrogen carbonate solution, or it can be formed by contacting in an aqueous solution cyanuric chloride and a water-soluble tertiary phosphate or higher homologue thereof known as polyphosphate, e.g. an alkali metal (sodium or potassium) or ammonium tertiary phosphate or polyphosphate.

It is preferred, however, to form the partial hydrolysis product by contacting in an aqueous solution cyanuric chloride and a water-soluble borate, more particularly by dissolving the cyanuric chloride in an aqueous solution of the borate, which is to be added for buffering purposes.

For convenience the aqueous solution of the partial hydrolysis product of cyanuric chloride buffered with borate will be called "the hardening solution" hereinafter.

For carrying out the process according to the present in practice the hardening solution can be added to an aqueous coating composition containing as a binding agent a protein, especially gelatin. The mixture obtained is coated in the form of a layer onto a support e.g. a plastic film, paper or glass, which may have been coated with previously applied layers, and dried thereafter whereby a final hardening of the protein, especially of the gelatin, sets in. It is also possible to dip the dried materials into the hardening solution or to apply the hardening solution to the dried layers.

The partial hydrolysis product of cyanuric chloride formed in aqueous alkaline medium according to U.S. Pat. No. 3,325,287 is a water-soluble salt e.g. sodium or potassium salt of 2,4-dichloro-6-hydroxy-s-triazine.

When the partial hydrolysis product of cyanuric chloride is formed by dissolving cyanuric chloride in an aqueous solution of a water-soluble tertiary phosphate or polyphosphate or of a water-soluble borate, a product might be formed e.g. corresponding to the formula:

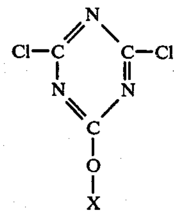

wherein X stands for one of the groupings:

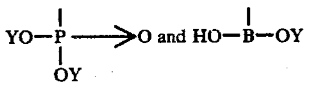

with Y representing sodium, potassium or ammonium.

The invention, however, is not dependent on the fact whether partial hydrolysis products of the above formula are formed or not. It is a fact that aqueous solutions of the partial hydrolysis products of cyanuric chloride after buffering by means of a water-soluble borate produce good hardenings of proteinaceous layers, especially of gelatin layers, after drying.

The buffered aqueous hardening solutions according to the present invention possess a lower reactivity than the cyanuric chloride cited above, so that the addition thereof to aqueous gelatin solutions only moderately influences the viscosity of the solutions, and no immediate and irreversible coagulation takes place as occurs when using cyanuric chloride itself. The buffered hardening solution has the same favourable effects as the water-soluble salt solutions of 2,4-dichloro-6-hydroxy-s-triazine formed in hydrogen carbonate solutions, but has markedly higher stability against further hydrolysis upon storing. Due to the improved shelf-life the buffered hardening solutions may be stored for long periods, even months, without loosing to a noteworthy extent their hardening effect on proteinaceous materials, more especially on gelatin. Moreover, there is no carbon dioxide gas formation during storage so that the hardening solutions can be stored in closed vessels without any risk of explosion and without risk of bubble-formation in the gelatin layers.

The buffered hardening solutions used according to the present invention can be made by suspending cyanuric chloride in aqueous alkaline medium, e.g. an aqueous hydrogen carbonate solution or an aqueous solution of a water-solution tertiary phosphate or polyphosphate, or of a water-soluble borate, preferably at room temperature, or slightly higher, e.g. 30° C., until complete dissolution, followed by buffering of the solution thus obtained with a water-soluble borate.

For obtaining solutions of the partial hydrolysis products the molar ratio of cyanuric chloride to hydrogen carbonate or borate is normally 1:2 and the molar ratio of cyanuric chloride to tertiary phosphate is normally 1:1. Since according to the invention the solutions of the partial hydrolysis products are buffered, a buffering amount of borate is added. It is preferred to use a buffering amount of borate corresponding to 0.5 to 2 moles of metaborate per mole of partial hydrolysis product. If the borate is also used to form the partial hydrolysis product, it is preferred to use a total amount corresponding to 2 to 4 moles of metaborate per mole of cyanuric chloride. Thereby the buffered hardening solution is kept alkaline (preferably between pH 7 and 10).

According to a preferred embodiment of the present invention the formation of the buffered partial hydrolysis product of cyanuric chloride can be achieved by dissolving cyanuric chloride in an aqueous solution of the water-soluble borate. The way according to which the cyanuric chloride is dissolved is not important. The cyanuric chloride can be suspended in an aqueous solution of the borate, preferably at room temperature or slightly higher e.g. 30° C. until complete dissolution. The cyanuric chloride may also be added from a solution in a suitable solvent e.g. acetone, acetone-water, or dioxan to the aqueous borate solution or vice versa.

The concentration of partial hydrolysis product is only limited by the fact that no crystallization should occur at room temperature in the solution. For storing purposes the concentration should be as high as possible. Stable hardening solutions have been prepared based on 5, 8 and 10% by weight of cyanuric chloride.

The aqueous hardener solutions, if necessary after dilution e.g. to a concentration corresponding to 3% by weight of cyanuric chloride and pH-adjustment, can be admixed directly with the aqueous protein solutions, especially aqueous gelatin solutions, to be hardened.

The hardening solution used according to the invention can be prepared more particularly as is illustrated by the following preparations.

PREPARATION 1

64.75 g (0.47 mole) of sodium metaborate ($NaBO_2.4H_2O$) were dissolved in 650 ml of water and introduced in a reaction vessel provided with a stirrer and cooling means. Then 36.8 g (0.2 mowas obtained having a pH of 7.

The solution was stable and could be stored for several weeks without loosing its hardening properties toward gelatin and other proteins.

In the same way other hardening solutions can be prepared wherein sodium metaborate has been replaced by potassium metaborate or ammonium metaborate, wherein the concentration of cyanuric chloride is changed and/or wherein the molar ratio of cyanuric chloride to metaborate, which in the above preparation is 1:2.35, is varied from 1:2 to 1:4.

PREPARATION 2

570 g (1.5 mole) of trisodium phosphate ($Na_3PO_4.12H_2O$) were dissolved in 4500 ml of water and introduced in a reaction vessel provided with a stirrer and cooling means. Then 276 g (1.5 mole) of cyanuric chloride were added and suspended with stirring at room temperature for 2 h. The suspension had now pH 7. For buffering purposes 206.8 g (1.5 mole) of sodium metaborate were added and the suspension was further stirred for 4 h until complete dissolution. The solution was filtered and diluted to 5520 ml. A solution was obtained having a pH of 7.5.

The hardening solution according to the invention can be used with advantage for hardening of photographic silver halide gelatin emulsion layers, as well as backing layers, protective layers, filter layers, and other auxiliary layers which contain gelatin or other proteins. The swelling and solubility characteristics of the proteinaceous material, e.g. gelatin, are reduced to the desired degree by the hardening process described.

A further advantage is that the treated layers do not become brittle.

A great advantage of the hardening solutions used according to this invention resides in the feature that they do not react under normal conditions with the colour couplers present in the colour photographic multilayer materials. Consequently, they can also be used in multilayer materials, in which non-diffusing colour couplers are present.

The hardening solution is generally added to the proteinaceous compositions, e.g. gelatin compositions, prior to coating. Normally these coating compositions have a pH from slightly acid to slightly alkaline, more particularly from about 6.5 to about 7.5. The viscosity of the coating solution is not raised. The amounts of hardening solution added depends on the desired effect and the concentration of initial cyanuric chloride. In general 20 to 2000 ml and preferably from 100 to 1000 ml of hardening solution per kg of dry protein, e.g. gelatin, are added based on a solution with an initial concentration of 5% of cyanuric chloride. The amount is reduced or increased proportionally to changes in this concentration. In this way, layers with a high melting point and with increased abrasion resistance are obtained.

Besides gelatin other hydrophilic colloids may be present in the layers to be hardened, e.g. albumin, zein, dextranes, dextrin, starch ethers, agar-agar, arabic gum, alginic acid and its derivatives, cellulose derivatives, e.g. hydrolysed cellulose acetate with an acetyl content of up to 19–26% polyacrylamide, vinyl alcohol polymers with urethane/carboxyl groups or cyanoacetyl groups such as copolymers of vinyl alcohol and vinyl cyanoacetate, polyacrylamides, polyvinylpyrrolidones, polymers formed e.g. by polymerisation of proteins of saturated acylated proteins with vinyl monomers, polyvinylpyridines, polyvinylamines, polyaminoethyl methacrylates and polyethyleneimines.

The degree of hardening of the proteinaceous layers by means of the hardening solutions of the invention can be gauged by determination of the abrasion resistance of the hardened layers. An apparatus is used wherein a steel sphere is drawn over the samples, this steel sphere having a diameter of 6 mm. The sphere is charged with an increasing weight and the abrasion resistance is the lowest weight (in g) at which the sphere begins to leave a visible scratch on the layer. A high abrasion resistance corresponds with a high hardening of the proteinaceous layer.

The admixture of polyhydric alcohols having at least two hydroxyl groups with the hardening compounds of the invention results in gelatin-containing layers having much improved physical properties, in particular an improved hardness. Suitable polyhydric alcohols are those described in U.S. Pat. No. 3,898,089, especially glycerol, trimethylolpropane, tri(2-hydroxyethyl)-ether of glycerol and ADMUL-1483, which is the trade name of Food Industries, Ltd. for a mixture mainly consisting of di-, tri- and tetraglycerol.

The invention is illustrated by the following examples.

EXAMPLE 1

A layer of gelatin was hardened by the use of the hardening solutions of the above preparation 1 (experiments 1 and 2) or preparation 2 (experiments 3 and 4).

The hardening solutions were added to 10% by weight aqueous gelatin solutions in amounts of 35 ml per kg of solution. The mixtures were coated on a dimensionally stable polyethylene terephthalate film, which had been provided with a known subbing layer composition. Coating occurred in such a way that after drying a layer of gelatin of about 10 μm was formed.

The test samples were stored at a temperature of 20° C. and a relative humidity of 60% for a time as indicated in the table.

Then the abrasion resistance of the layers was determined following the procedure outlined hereinbefore, after immersing for 10 min. the test samples, at different temperatures as indicated in the table, in a colour developer having a pH of 10.2. The following results were obtained:

| Experiment no. | Stored at 20° C. and 60% R.H. for | Abrasion resistance after immersion at 20° C. | at 38° C. | at 52° C. |
|---|---|---|---|---|
| 1 | 3 days | 700 | 500 | 400 |
| 2 | 7 days | 1300 | 1500 | 1500 |
| 3 | 3 days | 700 | 400 | 400 |
| 4 | 7 days | 1600 | 1600 | 850 |

No carbon dioxide gas formation could be observed during storage.

The gelatin layer was completely free of gas bubbles, which form when the sodium borate is replaced by sodium hydrogen carbonate or potassium hydrogen carbonate. The values found for abrasion resistance are of the same order of magnitude as are obtained with corresponding hardening solutions by the use of sodium hydrogen carbonate.

EXAMPLE 2

A commercial photographic colour material for printing was used comprising in order on a support:

1. green-sensitive gelatin silver halide emulsion layers containing magenta colour formers,
2. red-sensitive gelatin silver halide emulsion layers containing cyan colour formers,
3. blue-sensitive gelatin silver halide emulsion layers containing yellow colour formers.

To the coating composition for the protective gelatin antistress layer aqueous hardening solutions of the invention were added. These solutions were prepared according to the procedure of preparation 1 by the use of excesses of sodium metaborate of 1.0 mole. The solutions were added to the coating composition for the antistress layer after having been stored at 25° C. for 7 weeks in amounts corresponding to 3% by weight of cyanuric chloride with respect to the total amount of dry gelatin.

The film samples were stored at 20° C. and a relative humidity of 60% for a time as indicated in the table hereinafter.

Thereafter they were immersed for 10 min. at 36° C. in a colour developer having a pH of 10.2 and the abrasion resistance of the different layers was measured as indicated, the beginning of the scratch in the respective layers being visible by a difference in colour. The following results were obtained:

| Experiment no. | Film stored at 20° C. and 60% R.H. for | Abrasion resistance (grams) Green-sensitive layer | Red-sensitive layer | Blue-sensitive layer |
|---|---|---|---|---|
| 5 | 5 days | 600 | 600 | 1200 |
| 6 | 14 days | 675 | 675 | 1150 |

No carbon dioxide gas formation was noticed during storage of the hardened photographic materials.

The hardening solution did not impair to a noteworthy extent the photographic properties of the film materials such as fog, gradation, and sensitivity.

To illustrate the improved shelf-life of the hardening solutions, which are obtained when a borate was used as buffering agent for the partial hydrolysis product of cyanuric chloride, a series of experiments were carried out.

In a first experiment 2.5 moles of sodium hydrogen carbonate were dissolved in water, and in this solution 1 mole of cyanuric chloride was dissolved by stirring, the amount of water being such that the concentration of cyanuric chloride was 8%. The method described in U.S. Pat. No. 3,325,287 was followed.

In a second experiment the sodium hydrogen carbonate was replaced by a same amount of potassium hydrogen carbonate which has also been proposed in U.S. Pat. No. 3,325,287.

In a third experiment hydrolysis of the cyanuric chloride and buffering of the partial hydrolysis product occurred at the same time with sodium metaborate—a total amount of 2.5 moles of metaborate per mole of cyanuric chloride was used—following the process of the present invention (preparation 1).

The three hardening solutions formed were stored at 25° C. and the non-ionic chlorine content of the hardening solutions was determined at regular intervals.

The following results were obtained.

| Hydrolysis agent | non-ionic chlorine content in % with respect to total chlorine content | | | | |
|---|---|---|---|---|---|
| | immediately after formation | after 2 weeks | after 7 weeks | after 4 months | after 6 months |
| $NaHCO_3$ | 64 | 62.5 | 59 | 47 | 33 |
| $KHCO_3$ | 64 | 62 | 58 | 44 | 40 |
| $NaBO_2$ | 65 | 64.5 | 64 | 61 | 61 |

From these results it can be concluded that hydrolysis of cyanuric chloride with sodium hydrogen carbonate and potassium hydrogen carbonate continued during storage, as proved by the decreasing non-ionic chlorine content of both solutions. This continued hydrolysis was also proved by the continuous evolution of carbon dioxide gas from both solutions. In one instance the solution was stored in a closed vessel. The evolution of carbon dioxide gas was such that it led to an explosion of the receptacle after one month of storage.

In contrast, the stability of the hardening solution obtained with sodium metaborate was very good, as proved by the slight difference in non-ionic chlorine content noticed after a storage for 6 months. Of course, no carbon dioxide gas was formed so that the hardening solution could be stored in a closed vessel.

We claim:

1. A hardening solution for proteinaceous materials comprising an aqueous solution of a partial hydrolysis product of cyanuric chloride buffered with a water-soluble borate.

2. A hardening solution according to claim 1, wherein the water-soluble borate is sodium metaborate, potassium metaborate or ammonium metaborate.

3. A hardening solution according to claim 1, wherein the buffered solution is formed by dissolving cyanuric chloride in an aqueous solution of the borate.

4. A hardening solution according to claim 3, wherein the amount of borate corresponds to 2 to 4 moles of metaborate per mole of cyanuric chloride.

5. A hardening solution according to claim 1, wherein the concentration of partial hydrolysis product is based on 5% by weight of cyanuric chloride.

* * * * *

Disclaimer 4,216,108.—*Francis J. Sels,* Kontich; *Hendrik E. Kokelenberg, Merksem* and *George F. van Veelen,* Mortsel, Belgium. HARDNEING SOLUTION FOR PROTEINACEOUS MATERIALS. Patent dated Aug. 5, 1980. Disclaimer filed Mar. 18, 1981, by the assignee *Agfa-Gevaert, N. V.*

Hereby enters this disclaimer to all claims of said patent.

[*Official Gazette May 19, 1981.*]